United States Patent
Ooba

(10) Patent No.: US 11,584,011 B2
(45) Date of Patent: Feb. 21, 2023

(54) ROBOT CONTROL SYSTEM OF FITTING OF A PLURALITY OF POINTS

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 151 days.

(21) Appl. No.: 16/926,781

(22) Filed: Jul. 13, 2020

(65) Prior Publication Data

US 2021/0031372 A1 Feb. 4, 2021

(30) Foreign Application Priority Data

Aug. 1, 2019 (JP) .............................. JP2019-142137

(51) Int. Cl.
*B25J 9/16* (2006.01)
*B25J 13/08* (2006.01)

(52) U.S. Cl.
CPC ........... *B25J 9/1687* (2013.01); *B25J 9/1633* (2013.01); *B25J 9/1697* (2013.01); *B25J 13/085* (2013.01); *B25J 9/1653* (2013.01)

(58) Field of Classification Search
CPC ...... B25J 9/1687; B25J 9/1633; B25J 9/1697; B25J 13/085; B25J 13/089; B25J 19/023; B25J 9/161; B25J 13/00; B25J 18/00; B25J 19/04; B25J 9/1653; G05B 2219/40031; G05B 2219/40032; G05B 2219/40033; G05B 2219/40055
See application file for complete search history.

(56) References Cited

U.S. PATENT DOCUMENTS

| | | | | |
|---|---|---|---|---|
| 2004/0078114 | A1* | 4/2004 | Cordell | B25J 9/1692 700/258 |
| 2014/0163737 | A1* | 6/2014 | Nagata | B25J 9/1697 700/259 |
| 2017/0014995 | A1* | 1/2017 | Kato | B25J 9/1633 |
| 2017/0067728 | A1* | 3/2017 | Iwatake | G01B 21/04 |
| 2017/0151666 | A1* | 6/2017 | Kobayashi | B25J 9/1687 |
| 2021/0001486 | A1* | 1/2021 | Salem | B25J 9/1664 |
| 2022/0054201 | A1* | 2/2022 | Overbeeke | A61B 5/489 |

FOREIGN PATENT DOCUMENTS

| | | |
|---|---|---|
| JP | 201089238 A | 4/2010 |
| JP | 201574058 A | 4/2015 |
| WO | 9817444 A1 | 4/1998 |

* cited by examiner

*Primary Examiner* — Abby Y Lin
*Assistant Examiner* — Dylan M Katz
(74) *Attorney, Agent, or Firm* — Hauptman Ham, LLP

(57) ABSTRACT

A robot control system includes a relative relationship calculating section configured to calculate a relative relationship between a first member and a second member at least at one of a plurality of points based on data acquired by a vision sensor, a contact point determination section configured to determine a contact point between the first member and the second member based on the calculated relative relationship, a control point setting section configured to set a control point based on the determined contact point, and a fitting control section configured to control fitting of the plurality of points based on the set control point.

13 Claims, 12 Drawing Sheets

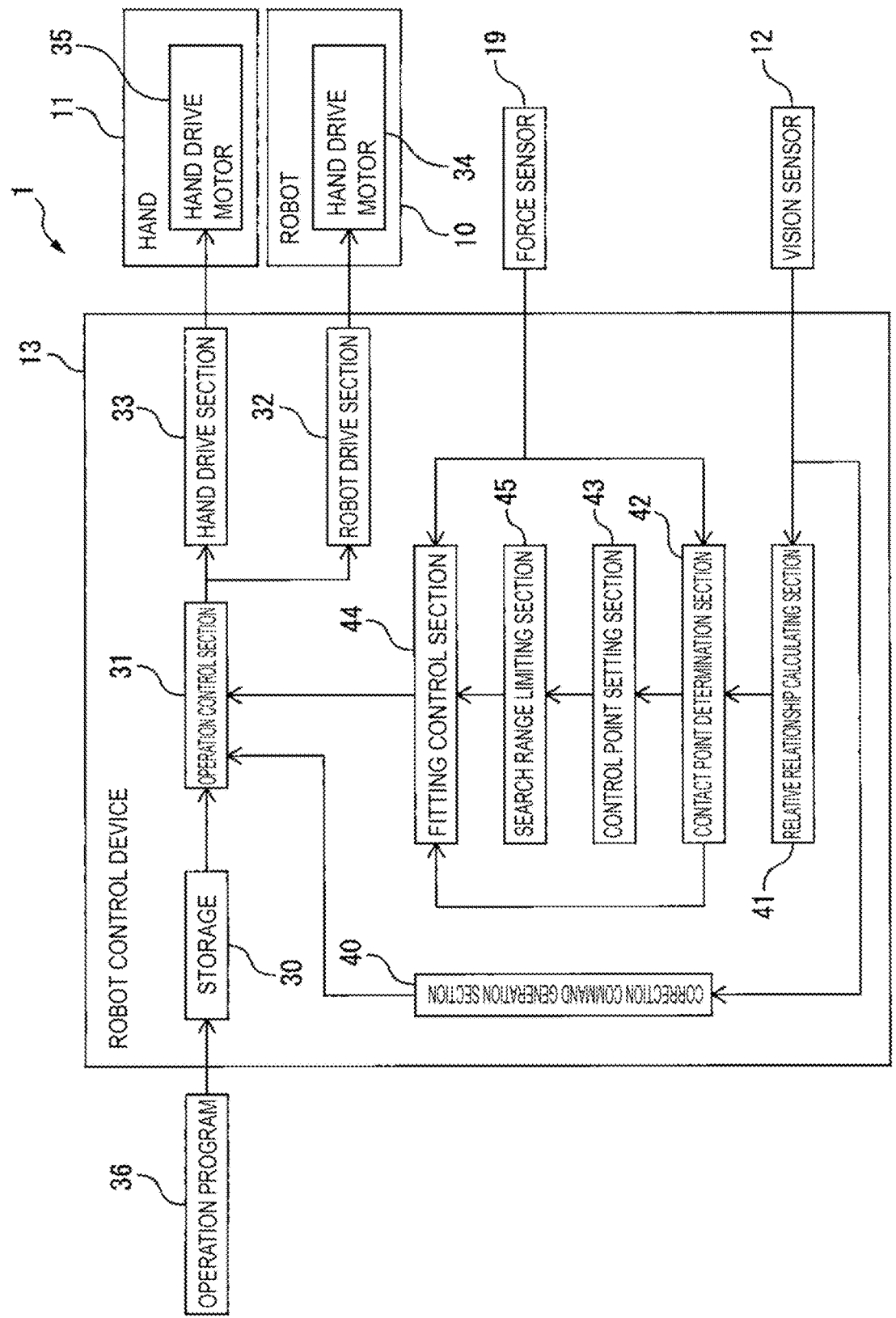

ROBOT CONTROL SYSTEM OF FITTING OF A PLURALITY OF POINTS

RELATED APPLICATIONS

The present application claims priority to Japanese Application Number 2019-142137, filed Aug. 1, 2019, the disclosure of which is hereby incorporated by reference herein in its entirety.

BACKGROUND OF THE INVENTION

1. Field of the Invention

The present invention relates to a robot control system, and more particularly relates to a robot control system for fitting a plurality of points.

2. Description of the Related Art

In a case where members are assembled together by using an industrial robot, it becomes difficult to fit the members together when a relative relationship (i.e., relative position or relative orientation) between the members changes. In a case where one member is stationary, a position and an orientation of the other member may be considered, but in a case where one member continues to move, a relative relationship between the members changes every moment, and therefore the difficulty of fitting increases. In the fitting work, robot control using a vision sensor or a force sensor is widely adopted.

WO 1998/017444 discloses a force control robot system configured to acquire a workpiece position/orientation representing a position/orientation relationship between a first workpiece and a second workpiece based on image data obtained by a vision sensor, and configured to correct a position and an orientation of a robot based on the acquired workpiece position/orientation data to allow a fitting operation to be performed while performing force control based on an output from a force sensor.

JP 2010-89238 A discloses that contact states in which a first component and a second component are in contact with each other and pieces of transition information that cause transition from each contact state to a next target state are associated and stored, the contact state is determined by using a detected value of a force sensor and image data of an image capturing apparatus, the transition information is selected based on the determined result, and fitting control is performed based on the selected transition information.

JP 2015-74058 A discloses that a target image when an end point of a movable section of a robot is at a target position and a current image when the end point is at a current position are acquired, a distance from the current position to the target position is calculated, and the robot is controlled by using a command value obtained by weighting and combining a command value by a visual servo and a command value by force control in response to the calculated distance.

SUMMARY OF THE INVENTION

When members are fitted together at a plurality of points, it is difficult to identify contact points because a force sensor detects reaction forces from the members at each point as a resultant force. Furthermore, various kinds of noise are superimposed on data acquired by the force sensor, and therefore, it is not easy to determine contact at one point or contact at a plurality of points. For example, when rigidity of gripping a member is low, noise caused by the rigidity is superimposed. Moreover, as for the force sensor, mechanistic co-rotational noise occurs, which means that even when a force is applied in only one direction, forces are also generated in other directions. Furthermore, when a gain of the force sensor is high, electric noise may be picked up from a cable or the like. Additionally, noise caused by aging, erosion, or the like of the force sensor may be generated. As a result, in the fitting work of a plurality of points, since it is difficult to identify positions of the contact points and the number of the contact points by using only the force sensor, and therefore, it is not clear where the members may be moved, and in which direction the members may be tilted, the robot may be controlled to a wrong position or orientation, and the fitting may fail.

Therefore, there is a demand for a technique that controls a robot configured to perform fitting of a plurality of points.

One aspect of the present disclosure provides a robot control system including a robot, a hand attached to an end of the robot and configured to grip a second member to be fitted to a first member at a plurality of points, a vision sensor disposed near the hand or at a fixed position separate from the robot, a relative relationship calculating section configured to calculate a relative relationship between the first member and the second member at least at one of the plurality of points based on data acquired by the vision sensor, a contact point determination section configured to determine a contact point between the first member and the second member based on the calculated relative relationship, a control point setting section configured to set a control point based on the determined contact point, and a fitting control section configured to control fitting of the plurality of points based on the set control point.

BRIEF DESCRIPTION OF THE DRAWINGS

FIG. 3 is a block diagram illustrating a configuration of the robot control system according to the embodiment.

DETAILED DESCRIPTION

Figure 1:
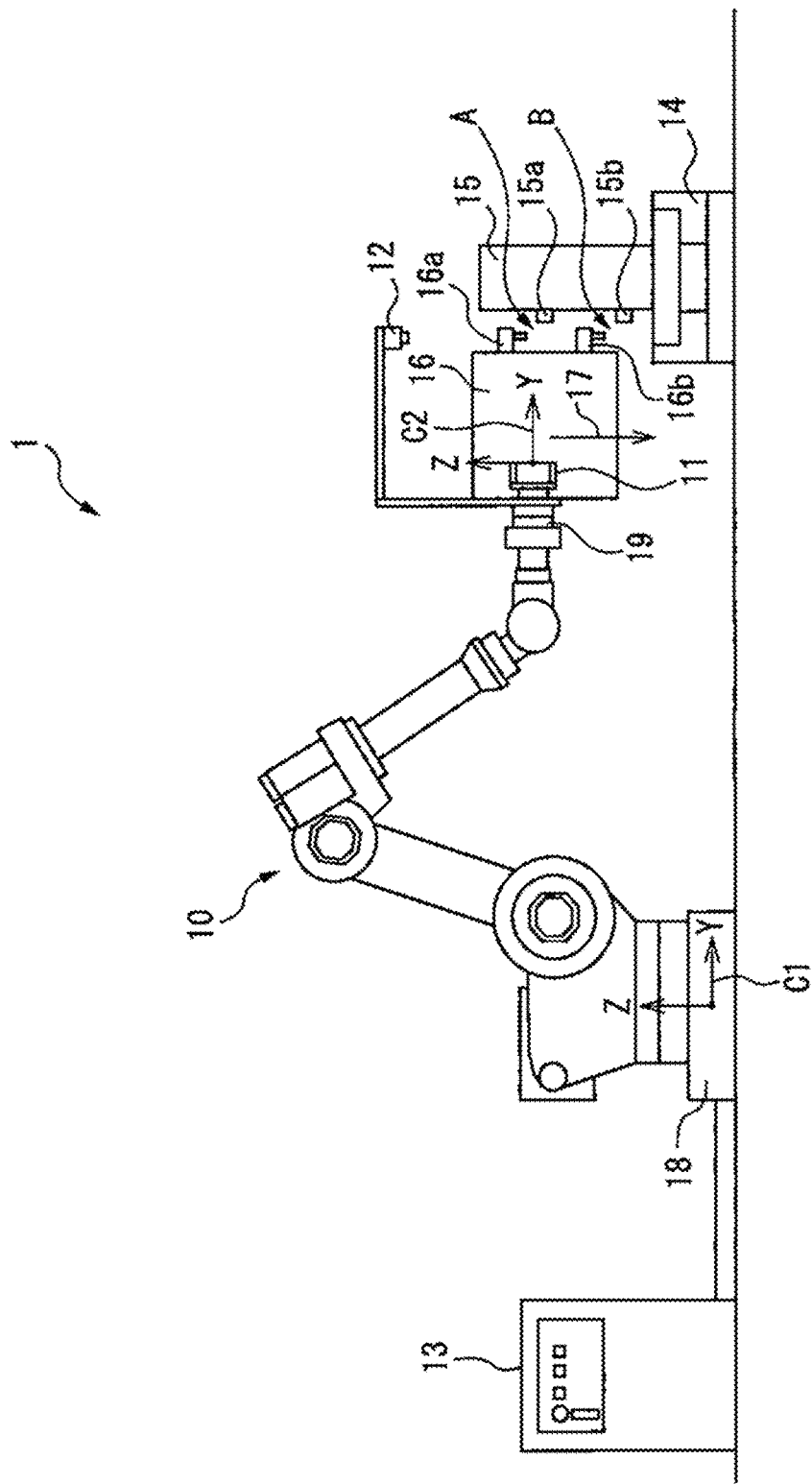
FIG. 1 is a side view illustrating a schematic configuration of a robot control system according to an embodiment.

Embodiments of the present disclosure will be described in detail below with reference to the accompanying drawings. In the drawings, identical or similar constituent elements are given identical or similar reference signs. Additionally, the embodiments described below are not intended to limit the technical scope of the invention or the meaning of terms set forth in the claims.

FIG. 1 illustrates a schematic configuration of a robot control system 1 according to the present embodiment. The robot control system 1 includes a robot 10, a hand 11 attached to an end of the robot 10, a vision sensor 12 disposed near the hand 11, and a robot control device 13 configured to control the robot 10 and the hand 11. The robot 10 is an articulated robot, but may be another industrial robot such as a parallel link type robot. The hand 11 is a hand provided with a plurality of claw parts, but other forms of hands such as a suction type hand may be used. The vision sensor 12 may be a two-dimensional sensor such as a charge-coupled device (CCD) camera, a three-dimensional sensor such as a time-of-flight (TOF) camera, or a laser scanner, or the like.

The hand 11 grips a second member 16 to be fitted to a first member 15 at a plurality of fitting points A and B, and the robot 10 performs assembling work in which the second member 16 is assembled to the first member 15. The first member 15 and the second member 16 are constituent members each of which is an object provided with a plurality of fitting points, and examples thereof include a frame and a door, a main body and a lid, a vehicle and a door, and the like. The number of fitting points may be equal to or more than three instead of two. The first member 15 may continue to move by being conveyed with a conveyor 14, or may be temporarily stationary by temporarily stopping the conveyor 14. Alternatively, the first member 15 may be fixed with a fixing device (not illustrated) to be kept stationary.

The assembling work by the robot 10 includes alignment control in which protrusions 16a and 16b of the second member 16 are aligned with recesses 15a and 15b of the first member 15, and fitting control in which the second member 16 is moved in a fitting direction 17 with the first member 15 to fit the protrusions 16a and 16b into the recesses 15a and 15b. Note that the protrusions 16a and 16b and the recesses 15a and 15b may be provided on the mutually opposite members. When the first member 15 is stationary, only a position and an orientation of the second member 16 may be considered, but in fitting of a plurality of points, the fitting fails due to only slight misalignment of a relative relationship between the members. Furthermore, when the first member 15 continues to move, the relative relationship between the members changes every moment, and therefore, the difficulty of fitting increases. Because of this, it is desirable to calculate the relative relationship between the members by using the vision sensor 12, to determine a contact point from the relative relationship, and then to perform the fitting control by vision control.

The robot control system 1 may further include a force sensor 19 between the robot 10 and the hand 11. The force sensor 19 may be a force sensor such as a strain gauge type, piezoelectric type, or capacitance type force sensor, and it is desirable to detect forces and moments along three axes, six axes, or the like. When relative sizes (clearances) of the protrusions 16a and 16b and the recesses 15a and 15b are relatively large, the fitting can be successful by only using the vision sensor 12, but when the relative sizes of the protrusions 16a and 16b and the recesses 15a and 15b are relatively small, the protrusions 16a and 16b are in contact with circumferential surfaces of recessed edges of the recesses 15a and 15b, and the fitting may never be successful. Thus, the force sensor 19 may be used to detect a reaction force from the member to perform the accurate fitting control based on the detected force, but as described above, in the fitting of the plurality of points, positions of contact points and the number of the contact points are difficult to be identified by only using the force sensor 19, and as a result, the robot may be controlled to a wrong position or orientation. Therefore, when the relative sizes of the protrusions and the recesses are relatively small, it is preferable to calculate a relative relationship between the members by using the vision sensor 12, to determine contact points from the relative relationship, and then to perform the fitting control by the force control.

Figure 2A:
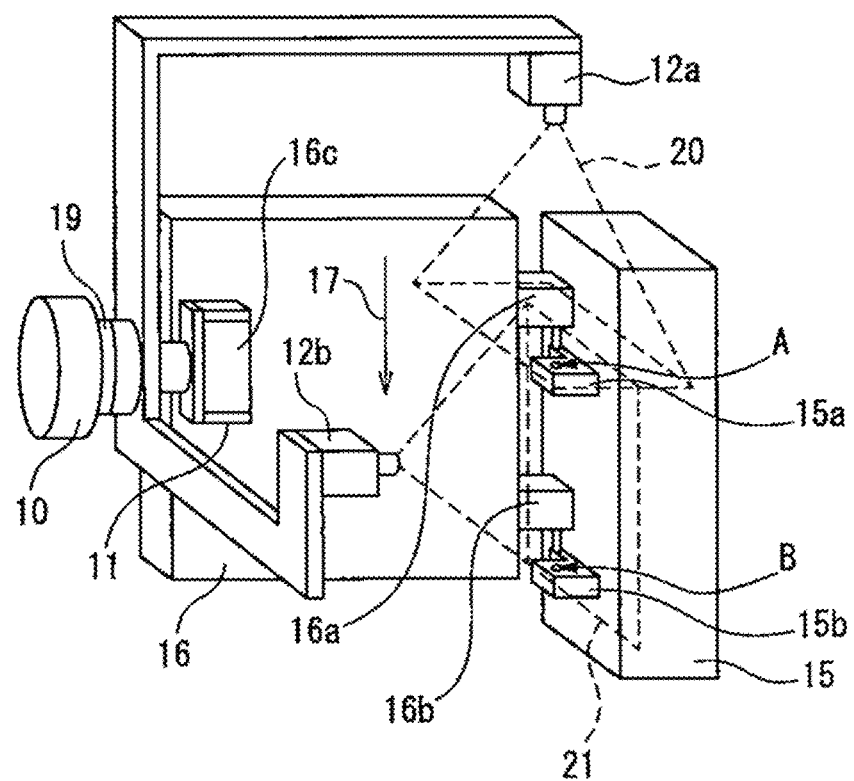
FIG. 2A is a perspective view illustrating a modified example of the number of vision sensors and gaze directions of the vision sensors.
Figure 2B:
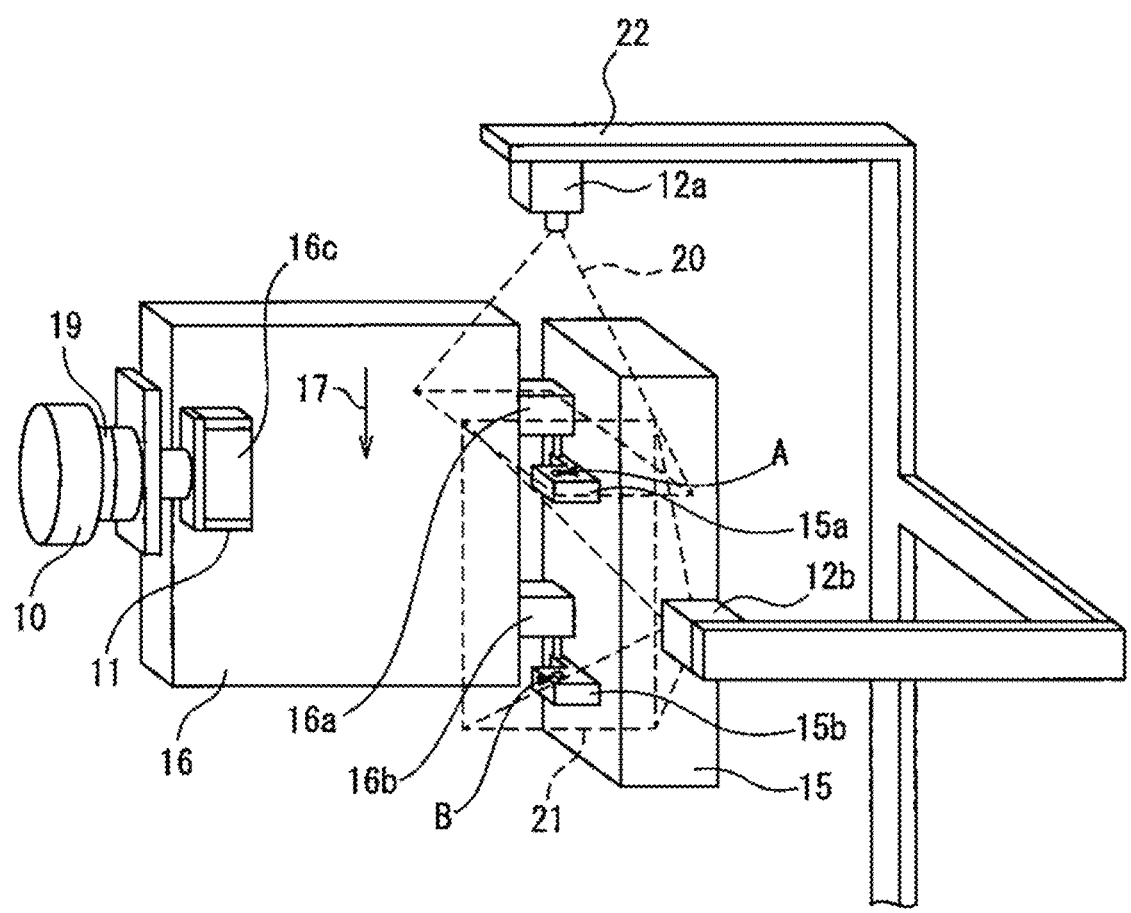
FIG. 2B is a perspective view illustrating a modified example of arrangement of the vision sensors.

FIGS. 2A and 2B illustrate a modified example of the vision sensor. Although FIG. 1 illustrates a situation in which one vision sensor 12 is disposed and at least one of the plurality of fitting points A and B is captured as an image, any of the fitting points A and B may be hidden behind the members and thus may not be determined where they are in contact with each other, and thereby as illustrated in FIGS. 2A and 2B, a plurality of vision sensors 12a and 12b may be disposed, and at least one of the plurality of fitting points A and B may be captured as an image from a different gaze direction. Additionally, the vision sensor 12b capable of capturing all of the fitting points A and B as an image may be disposed so as to be able to determine the number of contact points. In the present example, one vision sensor 12a captures an image of the fitting points A and B from above, and the other vision sensor 12b captures an image of the fitting points A and B from the side.

Additionally, as illustrated in FIG. 2B, the vision sensors 12a and 12b may be disposed at fixed positions separate from the robot 10. When the vision sensors 12a and 12b are disposed, for example, on a fixed column 22, it is preferred that the vision sensor 12a is disposed on the fixed column 22 such that at least one of the plurality of fitting points A and B falls within an image capturing range 20 of the one vision sensor 12a, and the vision sensor 12b is disposed such that at least one of the plurality of fitting points A and B falls within an image capturing range 21 of the other vision sensor 12b.

Referring back to FIG. 1, the robot control system 1 may set an origin of a robot coordinate system C1 on a base 18 of the robot 10 and set an origin of a tool coordinate system C2 in a vicinity of the hand 11 or the second member 16. In this case, the position of the robot 10 is expressed as the origin of the tool coordinate system C2, and the orientation of the robot 10 is expressed as a direction of the tool coordinate system C2 with respect to the robot coordinate system C1. The robot control system 1 is configured such that coordinate transformation can be mutually performed on any points in these coordinate systems.

FIG. 3 illustrates a configuration of the robot control system 1 according to the present embodiment. The robot control device 13 is a control device provided with a processor such as a central processing unit (CPU), and controls the robot 10 and the hand 11 by using an operation program 36 taught in advance. The robot control device 13 includes a storage 30 configured to store the operation program 36 and the like, an operation control section 31 configured to control operations of the robot 10 and the hand 11 based on the operation program 36, a robot drive section 32 configured to drive a robot drive motor 34, and a hand drive section 33 configured to drive a hand drive motor 35. The operation program 36 is a program in which basic operation commands for the robot 10 and the hand 11 that perform the assembling work are written, the operation control section 31 is configured to transmit an operation command to the robot drive section 32 and the hand drive section 33 based on the operation program 36, and the robot drive section 32 and the hand drive section 33 supply electricity to the robot drive motor 34 and the hand drive motor 35 based on the operation command.

The robot control device 13 preferably further includes a correction command generation section 40 configured to correct the operation command so that the alignment control of the first member and the second member can be performed even in a case where the first member is misaligned or continues to move. The correction command generation section 40 may calculate an amount of misalignment of the first member based on the data acquired by the vision sensor 12 to transmit a correction command to the operation control section 31, or may calculate an amount of movement prediction of the first member from various pieces of past data in addition to the amount of the misalignment to transmit a correction command to the operation control section 31. The operation control section 31 transmits an operation command to the robot drive section 32 and the hand drive section 33 based on the correction command. As a result, the alignment control is performed in which the protrusions of the second member are disposed directly above the recesses of the first member 15.

In order to perform the fitting control of a plurality of points after or while performing the alignment control, the robot control device 13 includes a relative relationship calculating section 41 configured to calculate a relative relationship between the members, a contact point determination section 42 configured to determine a contact point based on at least the relative relationship, a control point setting section 43 configured to set a control point based on the contact point, and a fitting control section 44 configured to control the fitting of the plurality of points. The relative relationship calculating section 41 calculates a relative relationship between the members based on the data acquired by the vision sensor 12. The relative relationship includes at least a relative position between the members, and desirably further includes a relative orientation between the members. The contact point determination section 42 may determine a contact point of the first member and the second member based on not only the relative relationship, but also data acquired by the force sensor 19.

Figure 4A:
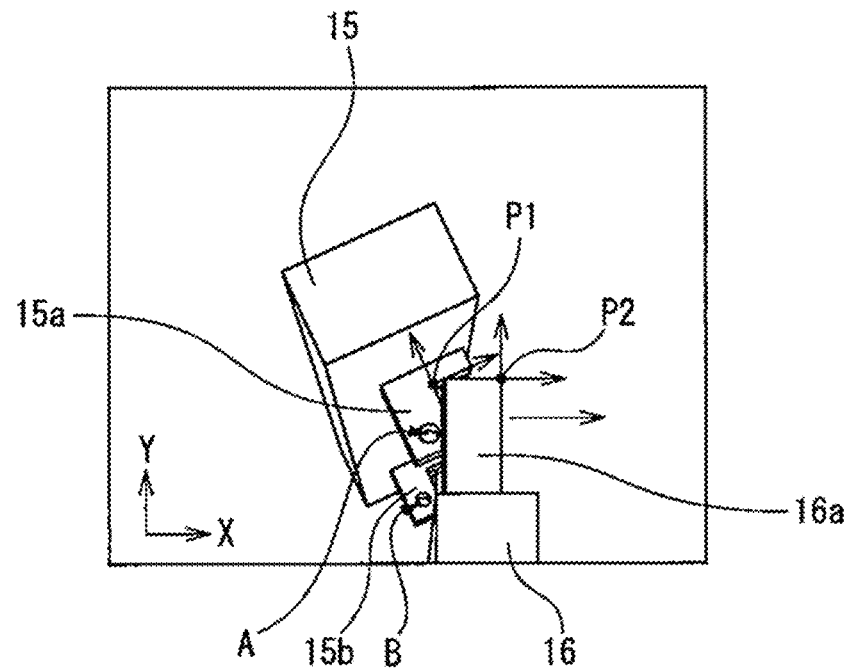
FIG. 4A is a diagram illustrating a relative relationship between members captured from above as an image.
Figure 4B:
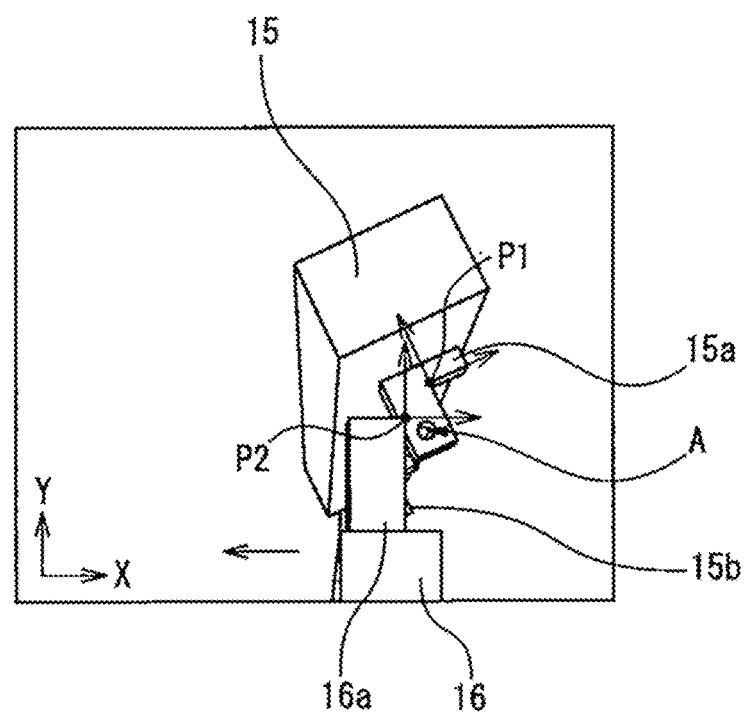
FIG. 4B is a diagram illustrating a relative relationship between the members captured from above as an image.
Figure 4C:
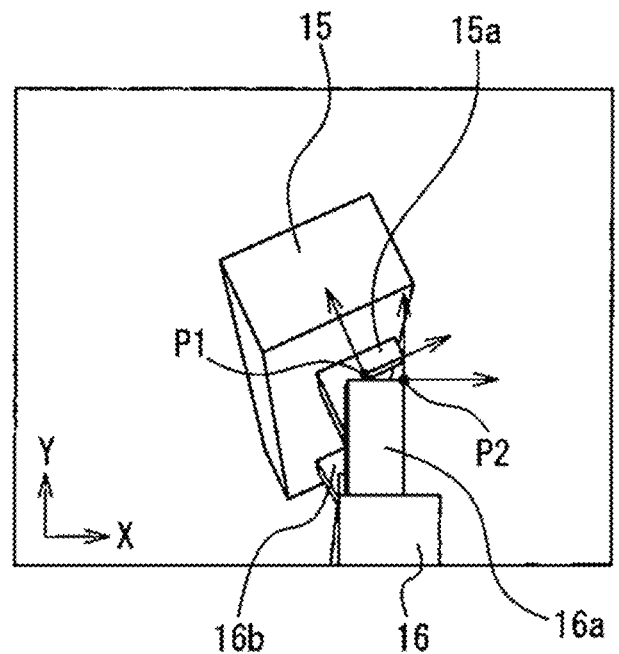
FIG. 4C is a diagram illustrating a relative relationship between the members captured from above as an image.
Figure 5A:
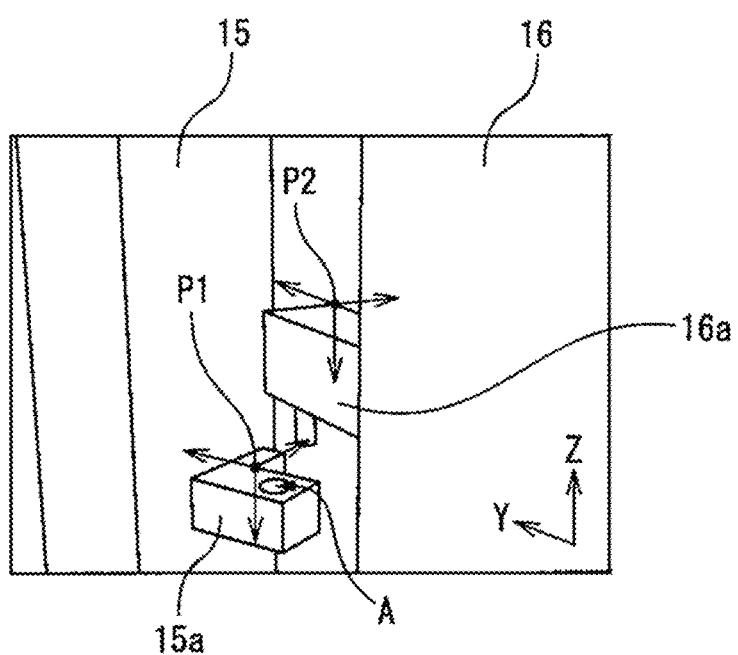
FIG. 5A is a diagram illustrating a relative relationship between the members captured from a side as an image.
Figure 5B:
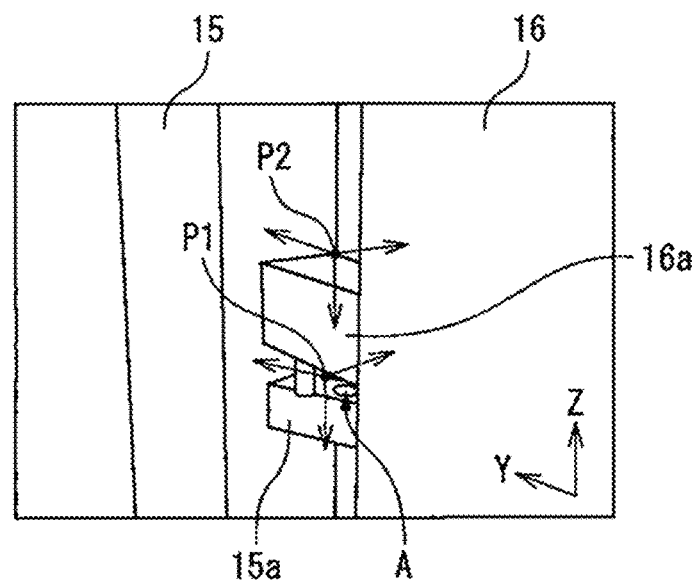
FIG. 5B is a diagram illustrating a relative relationship between the members captured from the side as an image.
Figure 5C:
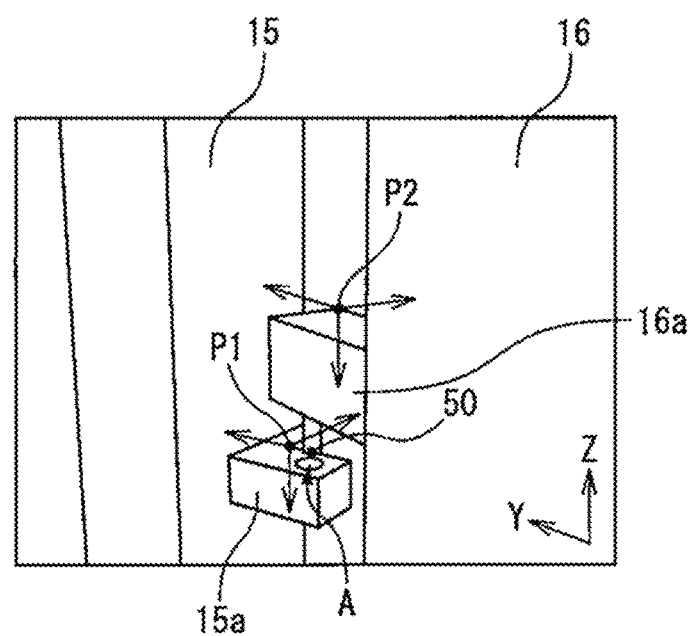
FIG. 5C is a diagram illustrating a relative relationship between the members captured from the side as an image.

FIGS. 4A to 4C illustrate relative relationships between the members captured as images from above, and FIGS. 5A to 5C illustrate relative relationships between the members captured as images from the side. A relative relationship can be calculated by various techniques, and may be performed, for example, as described below. First, the recess 15a of the first member 15 and the protrusion 16a of the second member 16 are detected by pattern matching among the data acquired by the vision sensor. A pattern prepared in advance may be a two-dimensional pattern or a three-dimensional pattern. The pattern matching is performed while the pattern is being rotated and a scale is being changed. After the recess 15a and the protrusion 16a are detected, a position of a feature point P1 with respect to a position of a feature point P2 is calculated as a relative position. Also, a rotation angle about each of three axes being orthogonal to each other and extending from the feature point P1 with respect to a rotation angle about each of three axes being orthogonal to each other and extending from the feature point P2 may be calculated as a relative orientation.

The presence or absence of a contact point is determined by comparing the calculated relative position to a predetermined threshold. Alternatively, the presence or absence of a contact point may be determined by comparing the relative orientation to a predetermined threshold, in addition to the relative position. Additionally, in a case where a force sensor is present, the presence or absence of a contact point may be determined based on data acquired by the force sensor. In addition, from both of the determination results, the more reliable determination result may be selected as appropriate. FIGS. 4A and 4B and FIGS. 5A and 5B illustrate a case of the absence of a contact point, and FIGS. 4C to 5C illustrate a case of the presence of a contact point. In the case of the presence of a contact point 50 as illustrated in FIG. 5C, a position of the contact point 50 is determined based on a relative relationship between the members. Also, in the case where the force sensor is present, the position of the contact point 50 may be determined based on the data acquired by the force sensor. Furthermore, by determining contact points not only for one fitting point A but also for the other fitting point B, the number of contact points is preferably determined.

Figure 6A:
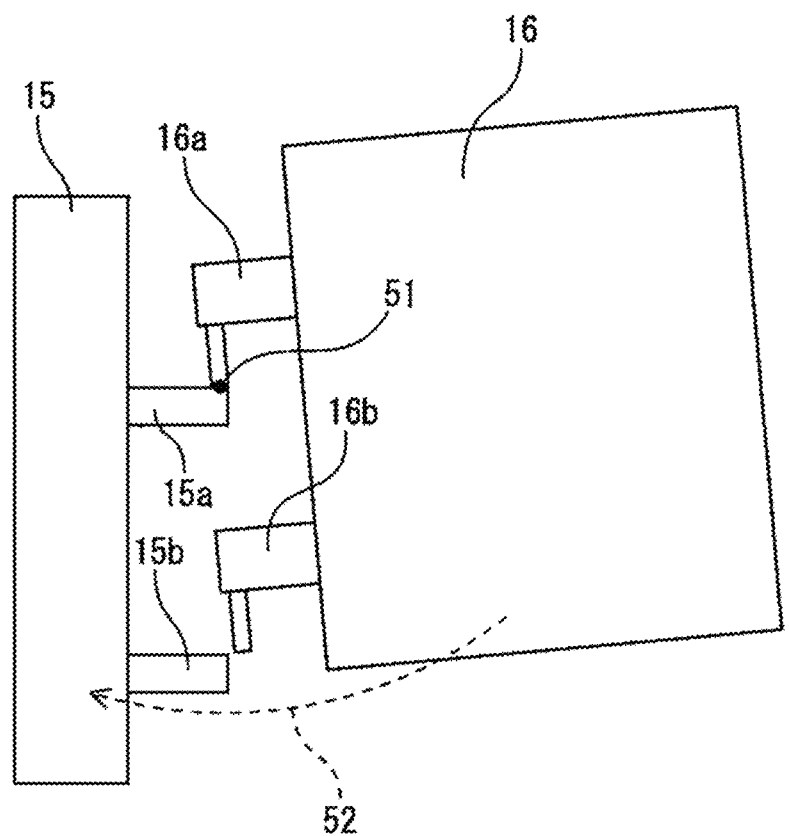
FIG. 6A is a side view illustrating a control point in a case of contact at one point.
Figure 6B:
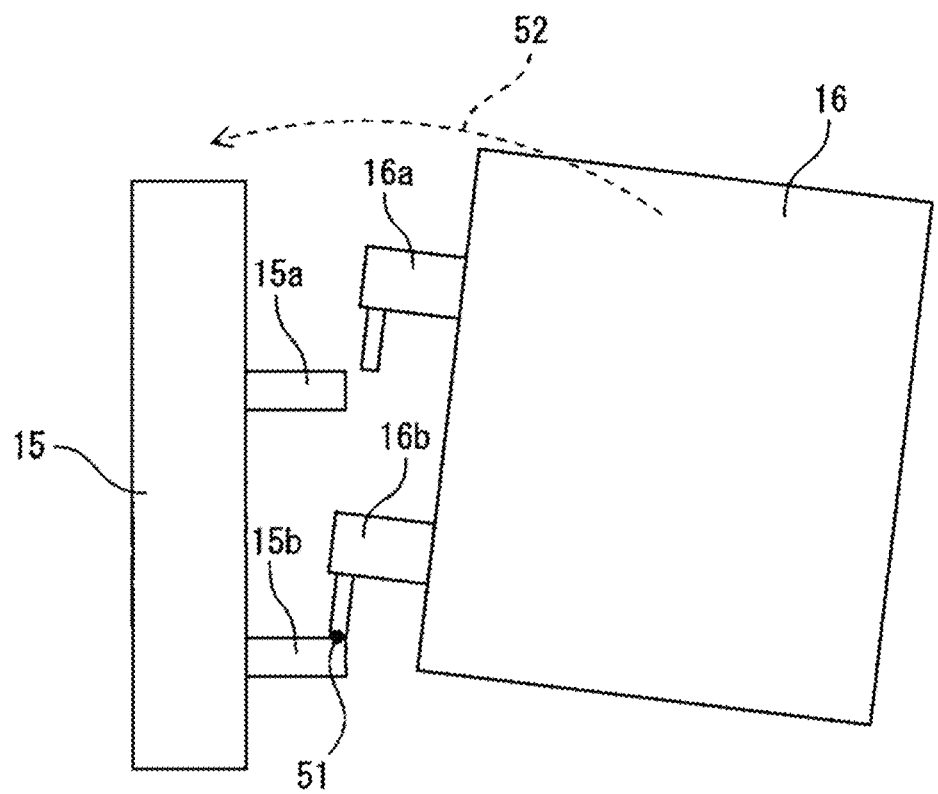
FIG. 6B is a side view illustrating a control point in a case of contact at one point.

Referring back to FIG. 3, when the absence of a contact point is determined, the fitting control section 44 transmits a correction command to the operation control section 31 based on a relative relationship between the members to allow the relative relationship between the members to be aligned. On the other hand, when the presence of a contact point is determined, the control point setting section 43 sets a control point based on the contact point. FIGS. 6A and 6B illustrate a control point 51 in a case of contact at one point. In a case where the first member 15 and the second member 16 are contact with each other at one point, the control point 51 is preferably set near the contact point. In a case where a tip of the protrusion 16a contacts the circumferential surface of the recessed edge of the recess 15a, the control point 51 is set at the contact point, and the orientation of the robot is controlled around the control point 51 as illustrated in an alignment direction 52. However, in a case where the tip of the protrusion 16a contacts an outer surface of the recess 15a, the position of the robot is preferably controlled such that the control point 51 is set at the tip of the protrusion 16a that is near the contact point (or at the fitting point A in a case where the robot grips the first member 15), and the control point 51 is aligned with a target position.

Figure 6C:
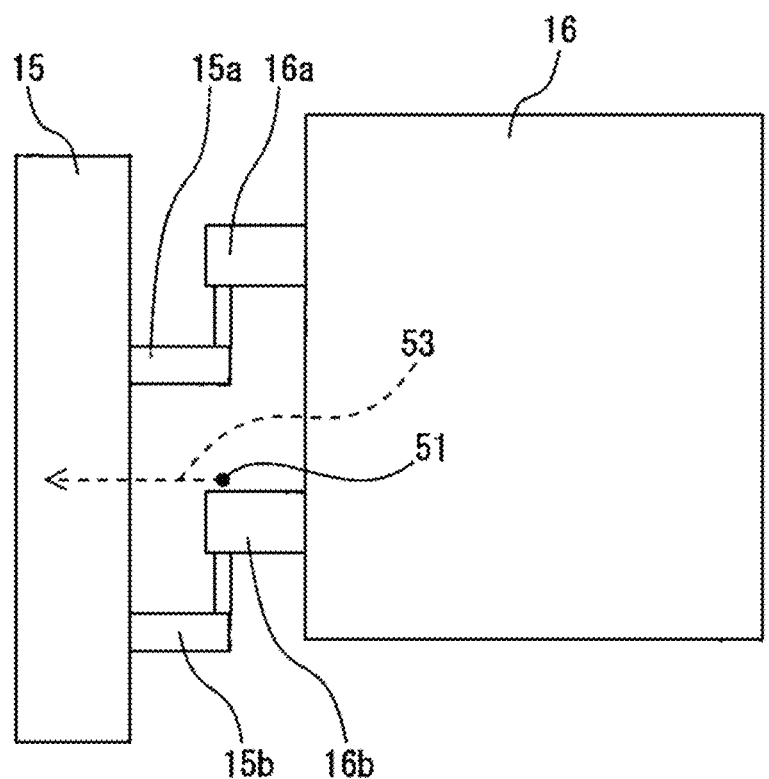
FIG. 6C is a side view illustrating a control point in a case of contact at a plurality of points.

FIG. 6C illustrates the control point 51 in a case of contact at a plurality of points. In a case where the first member 15 and the second member 16 are in contact at a plurality of points, the control point 51 is preferably set at a midpoint in a vicinity of the respective contact points. In a case where the tips of the protrusions 16a and 16b respectively contact the circumferential surfaces of the recessed edges of the recesses 15a and 15b, the control point 51 is set at a midpoint of the respective contact points, and the position of the robot is controlled so as to align the control point 51 with the target position as illustrated in the alignment direction 53. Furthermore, in addition to position control of the robot, the orientation of the robot may also be controlled around the control point 51 so as to be aligned with a target orientation. However, when the tips of the protrusions 16a and 16b are in contact with the outer surfaces of the recesses 15a and 15b, it is preferred that the control point 51 is set at a midpoint of the respective tips of the protrusions 16a and 16b that are near the respective contact points (or at a midpoint of the respective fitting points A and B in a case where the robot grips the first member 15), and the position of the robot is controlled so as to align the control point 51 with the target position.

Referring back to FIG. 3, the fitting control section 44 transmits a correction command to the operation control section 31 based on the set control point, as described above. In other words, the fitting control section 44 transmits a correction command that causes the orientation of the robot to be controlled around the control point, to the operation control section 31, in the case of contact at one point, and transmits a correction command that causes the control point to be aligned with the target position, to the operation control section 31, in the case of contact at a plurality of points.

Figure 7:
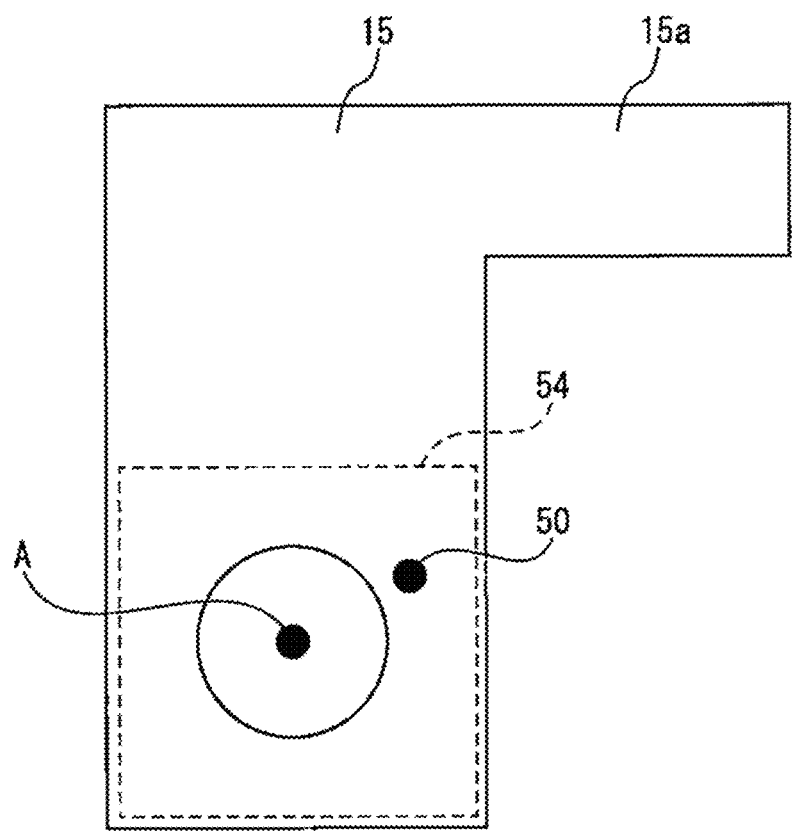
FIG. 7 is a plan view illustrating a search range of force control.

In a case where the alignment control is performed by force control, the robot control system 1 may further include a search range limiting section 45 configured to limit a search range of the force control based on data acquired by the vision sensor 12. FIG. 7 illustrates a search range 54 of the force control. The search range can be set by various techniques, and may be performed, for example, as described below. First, the recess 15a of the first member 15 is detected by pattern matching among the data acquired by the vision sensor 12, and a position of the fitting point A is determined. Then, the search range 54 of the force control is limited to a region around the fitting point A in the first member 15, that is, the circumferential surface of the recessed edge of the recess 15a of the first member 15.

Referring back to FIG. 3, the fitting control section 44 calculates a force and a moment at the control point based on data acquired by the force sensor while transmitting a correction command that causes scanning within the limited search range, to the operation control section 31, and transmits a correction command that causes the control point to be precisely aligned with the target position based on the calculated force and moment, to the operation control section 31.

Figure 8:
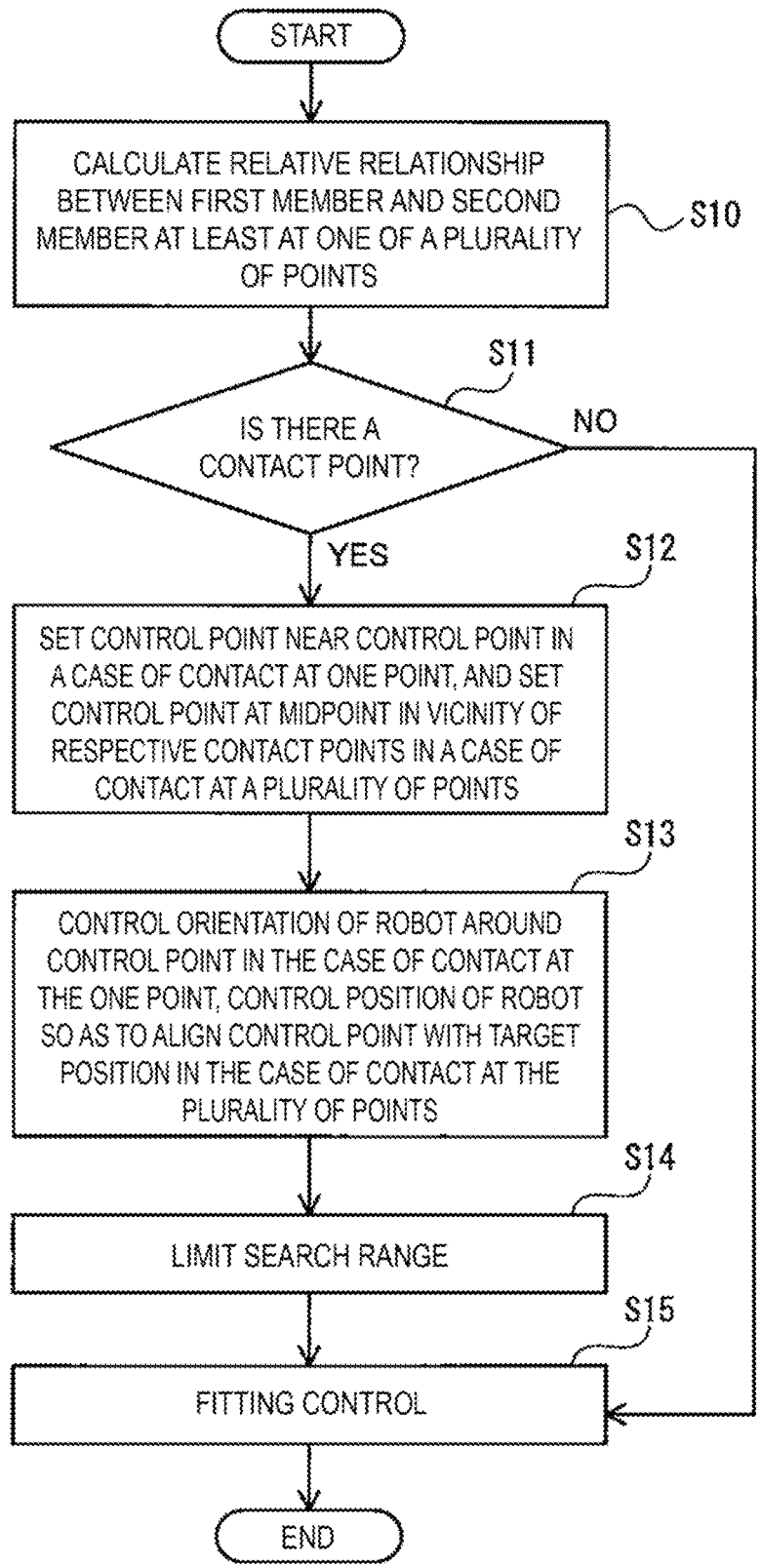
FIG. 8 is a schematic flowchart illustrating fitting control of the robot control system according to the embodiment.

FIG. 8 illustrates schematic fitting control of the robot control system 1 according to the present embodiment. In step S10, a relative relationship between the first member and the second member at least at one of a plurality of fitting points is calculated. In step S11, a contact point is determined based on the calculated relative relationship. When the absence of a contact point is determined, processing proceeds to step S15, fitting control that causes the relative relationship between the members to be aligned is performed. When the presence of a contact point is determined, a control point is set near the contact point in a case of contact at one point in step S12, and a control point is set at a midpoint in a vicinity of the respective contact points in a case of contact at a plurality of points.

Furthermore, in step S13, an orientation of the robot is controlled around the control point in the case of contact at the one point. In the case of contact at the plurality of points, it is preferable to control a position of the robot so as to align the control point with a target position. In addition, in a case where the fitting control is performed by force control, in step S14, a search range of the force control is limited. In step S15, the fitting control is performed by vision control alone or by force control in addition to vision control.

According to the above-described embodiment, the robot 10 that performs fitting of a plurality of points can be controlled. Note that in FIG. 3, the correction command generation section 40, the relative relationship calculating section 41, the contact point determination section 42, the control point setting section 43, the fitting control section 44, and the search range limiting section 45 may be arranged in a host computer device rather than the robot control device 13.

A program that is executed by the computer described above may be provided in a state where the program has been recorded in a computer-readable non-transitory recording medium, such as a CD-ROM.

Although various embodiments have been described in this specification, the present invention is not limited to the above-described embodiments, and it is to be understood that various changes can be made without departing from the scope of the appended claims.

The invention claimed is:

1. A robot control system comprising:
   a robot;
   a hand attached to an end of the robot and configured to grip a second member to be fitted at a plurality of points to a first member;
   a vision sensor disposed near the hand or at a fixed position separate from the robot;
   a relative relationship calculating section configured to calculate a relative relationship between the first member and the second member at least at one of the plurality of points based on data acquired by the vision sensor;
   a contact point determination section configured to determine a contact point between the first member and the second member based on the calculated relative relationship;
   a control point setting section configured to set a control point based on the determined contact point; and
   a fitting control section configured to control fitting of the plurality of points based on the set control point,
   wherein when a plurality of the contact points are present, the control point setting section is configured to set a control point at a midpoint in a vicinity of the respective contact points, and the midpoint is not on the first and second members.

2. The robot control system of claim 1, further comprising:
   a force sensor disposed between the robot and the hand, wherein
   the fitting control section is configured to perform fitting of the plurality of points by force control based on data acquired by the force sensor.

3. The robot control system of claim 1, wherein
   when only one contact point is present, the control point setting section is configured to set a control point near the contact point.

4. The robot control system of claim 3, wherein when only one contact point is present, the fitting control section is configured to control an orientation of the robot around the control point.

5. The robot control system of claim 1, wherein
   when the plurality of the contact points are present, the fitting control section is configured to
   control a position of the robot in such a manner that the control point is aligned with a target position, or
   control an orientation of the robot in such a manner that the orientation of the robot is aligned with a target orientation, in addition to the control of the position of the robot.

6. The robot control system of claim 2, further comprising:
   a search range limiting section configured to limit a search range of the force control based on data acquired by the vision sensor.

7. The robot control system of claim 6, wherein the search range is limited to a region around a fitting point in the first member.

8. The robot control system of claim 1, wherein the vision sensor is configured to capture at least one of the plurality of points as an image.

9. The robot control system of claim 1, wherein a plurality of the vision sensors are provided, and are configured to capture at least one point of the plurality of points as an image from a different gaze direction.

10. The robot control system of claim 1, wherein the relative relationship includes a relative position between the first member and the second member.

11. The robot control system of claim 10, wherein the relative relationship further includes a relative orientation between the first member and the second member.

12. The robot control system of claim 1, wherein the second member includes an L-shaped protrusion a tip of which contacting a circumferential surface of an edge of a recess of the first member when the second member is fitted to the first member.

13. The robot control system of claim 1, wherein the contact point determination section is configured to determine a contact point between the first member and the second member by comparing the calculated relative relationship to a predetermined threshold.

* * * * *